US008910126B2

(12) United States Patent
Bates et al.

(10) Patent No.: US 8,910,126 B2
(45) Date of Patent: *Dec. 9, 2014

(54) COMPILING SOURCE CODE FOR DEBUGGING WITH VARIABLE VALUE RESTORATION BASED ON DEBUGGING USER ACTIVITY

(75) Inventors: Cary L. Bates, Rochester, MN (US); Justin K. King, Rochester, MN (US); Lee Nee, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/449,489

(22) Filed: Apr. 18, 2012

(65) Prior Publication Data
US 2013/0283243 A1 Oct. 24, 2013

(51) Int. Cl.
*G06F 9/44* (2006.01)
(52) U.S. Cl.
USPC .......................................................... 717/129
(58) Field of Classification Search
None
See application file for complete search history.

(56) References Cited

U.S. PATENT DOCUMENTS

| 4,953,084 | A   | 8/1990  | Meloy et al. |
| 5,450,586 | A   | 9/1995  | Kuzara et al. |
| 6,091,896 | A   | 7/2000  | Curreri et al. |
| 6,256,777 | B1  | 7/2001  | Ackerman |
| 6,434,741 | B1  | 8/2002  | Mirani et al. |
| 6,553,565 | B2  | 4/2003  | Click, Jr. et al. |
| 6,795,963 | B1  | 9/2004  | Andersen et al. |
| 8,359,584 | B2* | 1/2013  | Rao et al. ...................... 717/133 |
| 2006/0064676 | A1 | 3/2006 | Chavan |
| 2009/0144705 | A1 | 6/2009 | Oda |
| 2011/0131561 | A1 | 6/2011 | Adams, III et al. |
| 2012/0042303 | A1 | 2/2012 | Demetriou et al. |
| 2012/0102459 | A1* | 4/2012 | Bates ............................ 717/124 |
| 2013/0275947 | A1 | 10/2013 | Bates |
| 2013/0275948 | A1 | 10/2013 | Bates et al. |

OTHER PUBLICATIONS

Pollock, Lori, Mary Bivens, and Mary Lou Soffa. "Debugging Optimized Code via Tailoring." Software Engineering Notes 19 (1994): 201-201.*
Chambers et al., "Debugging Optimized Code With Dynamic Deoptimization", Proceedings of the ACM SIGPLAN 1992 Conference on Programming Language Design and Implementation, Jul. 1992, pp. 32-43, vol. 27, Issue 7, ACM New York, NY, USA.
Bivens et al., "Debugging Optimized Code Via Tailoring", Proceedings of the 1994 ACM SIGSOFT International Symposium on Software Testing and Analysis, Aug. 1994, pp. 1-21, ACM New York, NY, USA.

* cited by examiner

*Primary Examiner* — Li B Zhen
*Assistant Examiner* — Sen Chen
(74) *Attorney, Agent, or Firm* — Biggers Kennedy Lenart Spraggins, LLP (57) ABSTRACT

Compiling source code includes receiving, by an optimizing compiler from a debugger, a variable value modification profile that specifies locations in the source code at which variable values modified during a debug session; compiling the source code, including: inserting snapshots at one or more of the locations in the source code at which variable values were modified, each snapshot including a breakpoint; and only for each snapshot at a location in the source code at which variable values were modified: inserting, between the breakpoint and remaining source code at the location of the snapshot, a module of computer program instructions that when executed retrieves a current value of a variable and stores the current value in a register; and recording the location of each inserted snapshot; and providing, to the debugger by the optimizing compiler, the recorded locations of each inserted snapshot along with the compiled source code.

15 Claims, 4 Drawing Sheets

COMPILING SOURCE CODE FOR DEBUGGING WITH VARIABLE VALUE RESTORATION BASED ON DEBUGGING USER ACTIVITY

BACKGROUND OF THE INVENTION

1. Field of the Invention

The field of the invention is data processing, or, more specifically, methods, apparatus, and products for compiling source code for debugging and debugging such compiled source code.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer systems evolve, software applications also evolve. Applications are increasingly more complex and computationally powerful. Such applications may be cumbersome in execution. To reduce the complexity of executing such applications, optimizing compilers are used to compile source code of an application into machine executable instructions while tuning or optimizing portions of the application. Such optimizations may be directed to minimize or maximize some attributes of the executable computer program. For example, an optimizing compiler may attempt to minimize the time needed to execute a program or to minimize the amount of memory used during execution. The optimizing compiler makes these changes by removing, rearranging, simplifying, or modifying the original source code instructions.

When an optimizing compiler compiles source code for debugging, the optimized portions of the source code are often removed from a debugger's scope given that the original source code instructions viewed by the debugger may not directly correspond to the same machine instructions generated by the optimizing compiler. That is, optimized portions of the application are generally not debuggable. To indicate to a debugger the portions of the source code which are debuggable, the optimizing compiler may insert a snapshot. A snapshot, as the term is used in this specification, is a directive and a specification of one or more variables, where the directive enables a user of a debugger to establish a breakpoint in a debug session at the location of the snapshot and to examine the specified variables when program execution reaches the snapshot location. Such snapshots, when inserted by an optimizing compiler, are inserted without any regard to a debug user's preference.

SUMMARY OF THE INVENTION

Methods, apparatus, and products for compiling source code for debugging are disclosed in this specification. Such compilation of source code includes: receiving, by an optimizing compiler from a debugger, a variable value modification profile of the source code, the variable value modification profile specifying one or more locations in the source code at which variable values were modified during a debug session. Compilation of source code in accordance with embodiments of the present invention also includes inserting a plurality of snapshots including snapshots at one or more of the locations in the source code at which variable values were modified, each snapshot including a breakpoint; and for each snapshot at a location in the source code at which variable values were modified: inserting, between the breakpoint and the remaining source code at the location of the snapshot, a module of computer program instructions that when executed retrieves a current value of a variable and stores the current value in a register; and recording the location of each inserted snapshot. Once the location of each inserted snapshot is recorded, the optimizing compiler provides, to the debugger, the recorded locations of each inserted snapshot along with the compiled source code.

Methods, apparatus, and product for debugging such source code are disclosed. Such debugging includes: tracking, by a debugger during a debug session of the source code, user-invoked variable value modifications at locations in the source code; generating, by the debugger in dependence upon the tracked variable value modifications, a variable value modification profile of the source code; providing, by the debugger to an optimizing compiler, the variable value modification profile of the source code; and receiving, by the debugger from the optimizing compiler, compiled source code that includes: a plurality of snapshots including snapshots inserted at one or more of the locations in the source code at which variable values were modified, each snapshot including a breakpoint; and for each snapshot at a location in the source code at which variable values were modified: a module of computer program instructions, between the breakpoint and the remaining source code at the location of the snapshot, that when executed retrieves a current value of a variable and stores the current value in a register. The debugger also receives, from the optimizing compiler, a recording of the location of each inserted snapshot.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
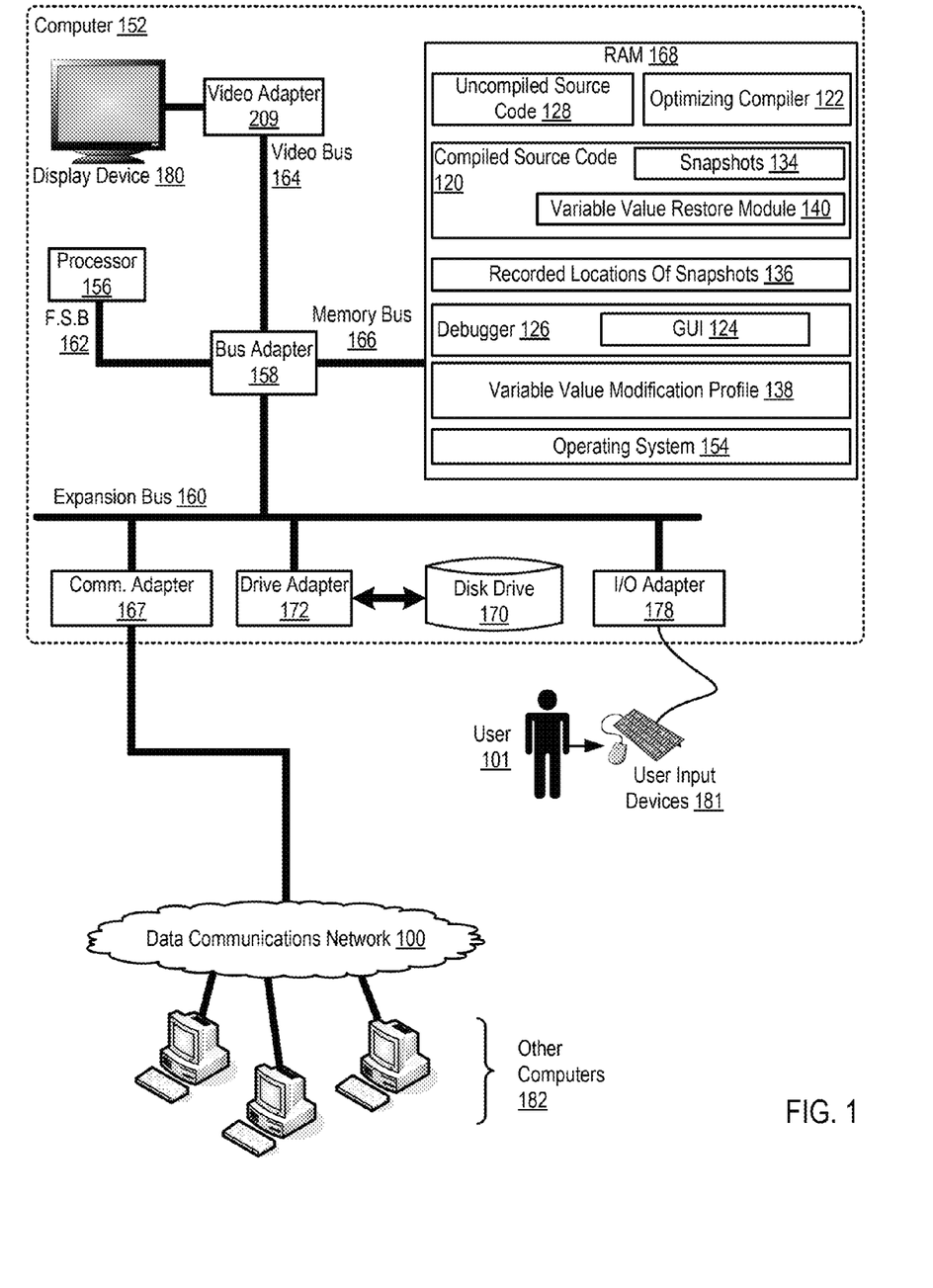
FIG. 1 sets forth a network diagram of a system for compiling source code for debugging and debugging the source code according to embodiments of the present invention.

Exemplary methods, apparatus, and products for compiling source code for debugging and debugging such source in accordance with the present invention are described with reference to the accompanying drawings, beginning with FIG. 1. FIG. 1 sets forth a network diagram of a system for compiling source code for debugging and debugging the source code according to embodiments of the present invention. The system of FIG. 1 includes automated computing machinery comprising an exemplary computer (152) useful in compiling source code for debugging and debugging such source according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an optimizing compiler (122) and a debugger (126). A debugger is a computer program that is used to test and debug other programs. A compiler is a computer program or set of programs that transforms source code written in a programming language (the source language) into another computer language (the target language). The most common reason for wanting to transform source code is to create an executable program. The debugger in the example of FIG. 1 provides a graphical user interface ('GUI') (124) through which a user (101) may interact.

An optimizing compiler is a compiler that is configured to tune the output of the compiler to minimize or maximize some attributes of an executable computer program. Such optimization may include minimizing the time taken to execute a program or minimizing the amount of memory utilized by the program during program execution. The compiler can output a debuggable program that debuggable information that may describe the data type of variables or functions and correspondence between source line numbers and addresses in executable code.

The optimizing compiler (122) of FIG. 1 is configured for compiling source code in accordance with embodiments of the present invention and the debugger (126) in the example of FIG. 1 is configured for debugging source code in accordance with embodiments of the present invention.

As explained above an optimizing compiler may insert snapshots to render portions of the source code debuggable. In prior art optimizing compilers, each snapshot includes additional instructions inserted by the compiler that enables a debugger upon a stop in application execution to inspect and modify variable values in high level memory, such as RAM, and upon resuming execution restoring the values from high level memory to low level memory, such as processor registers. In prior art optimizing compilers, these additional instructions are inserted for each and every snapshot without regard to a debug user's preferences. These instructions consume compile time and execution time.

In the example of FIG. 1, the debugger (126) is configured to track, during a debug session of the source code (120)—source code compiled with variable value restoration instructions at each snapshot—user-invoked variable value modifications at locations in the source code. That is, the debugger tracks actual user (101) actions related to variable value modification during a debug session of source code compiled in accordance with prior art optimizing compiler techniques. The term 'source code location' as used in this specification may refer to a single line of source code, a predefined number of source code lines, a function call, a function, a set of lines comprising declarations, a set of lines comprising definitions, or some other portion of source code.

The debugger (126) generates, in dependence upon the tracked variable value modifications, a variable value modification profile (138) of the source code. The variable value modification profile in the example of FIG. 1 includes a specification of one or more locations in the source code (120) at which variable values were modified by the user during the debug session. The debugger (126) may then provide, to the optimizing compiler (122), the variable value modification profile of the source code. The debugger (126) may provide such a variable value modification profile (138) to the optimizing compiler (122) in various ways including, for example, as part of an object file, as a predefined data structure, through a notification or message, or in other ways as will occur to readers of skill in the art.

The optimizing compiler (122) may then receive the variable value modification profile (138) from the debugger (126) and proceed to compile the source code (128). In compiling the source code (128), the optimizing compiler (122): inserts a plurality of snapshots (134), at least some of which include snapshots at one or more of the locations in the source code at which variable values were modified by the user (101) during a previous debug session and each snapshot includes a breakpoint. Then, only for each snapshot at a location in the source code at which variable values were modified, the compiler (122) inserts, between the breakpoint and the remaining source code at the location of the snapshot, a module (140) of computer program instructions that when executed retrieves a current value of a variable and stores the current value in a register. The compiler (122) records the location of each inserted snapshot and provides, to the debugger, the recorded locations (136) of each inserted snapshot along with the compiled source code (120). In this way, the optimizing compiler (122) inserts variable value restoration instructions (140) only at the snapshot locations (134) at which the debug user (101) previously modified variable values. That is, compile time may be decreased by reducing the number snapshots at which the compiler must insert variable value restoration instructions.

The compiled source code (120), during a debug session, will halt execution at the breakpoint at a snapshot location at which the variable value restoration instructions are inserted, enabling the user (101) to view the variable values and modify the variable values. When execution is resumed, the application will execute the remaining portion of the instructions at the snapshot location after the breakpoint then execute the variable value restoration instructions, restoring the variable values to a register from main memory. In this way, during the debug session, the variable value restoration instructions (140) are only executed at snapshot locations at which the debug user previously modified variable values. That is, execution time of the program as a whole is decreased by reducing the number of variable value restoration instructions actually executed during a debug session.

Also stored in RAM (168) is an operating system (154). Operating systems useful for compiling source code and debugging such source according to embodiments of the present invention include UNIX™, Linux™, Microsoft XP™, AIX™, IBM's i5/OS™, and others as will occur to those of skill in the art. The operating system (154), optimizing compiler (122), uncompiled source code (128), compiled source code (120), debugger (126), recorded locations of snapshots (136), and the variable value modification profile (138) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for compiling source code for debugging and debugging such source according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for compiling source code for debugging and debugging such source according to embodiments of the present invention include modems for wired dial-up communications, Ethernet (IEEE 802.3) adapters for wired data communications, and 802.11 adapters for wireless data communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

The compiler (122) and the debugger (126) in the example of FIG. 1 are both modified in accordance with embodiments of the present invention. Although the two may be included in a single system, the two also operate separately in accordance with embodiments of the present invention. To that end, FIG. 2 sets forth a flow chart illustrating an exemplary method of compiling source code for debugging according to embodiments of the present invention while FIG. 3 is directed to actions of a debugger configured in accordance with embodiments of the present invention.

Figure 2:
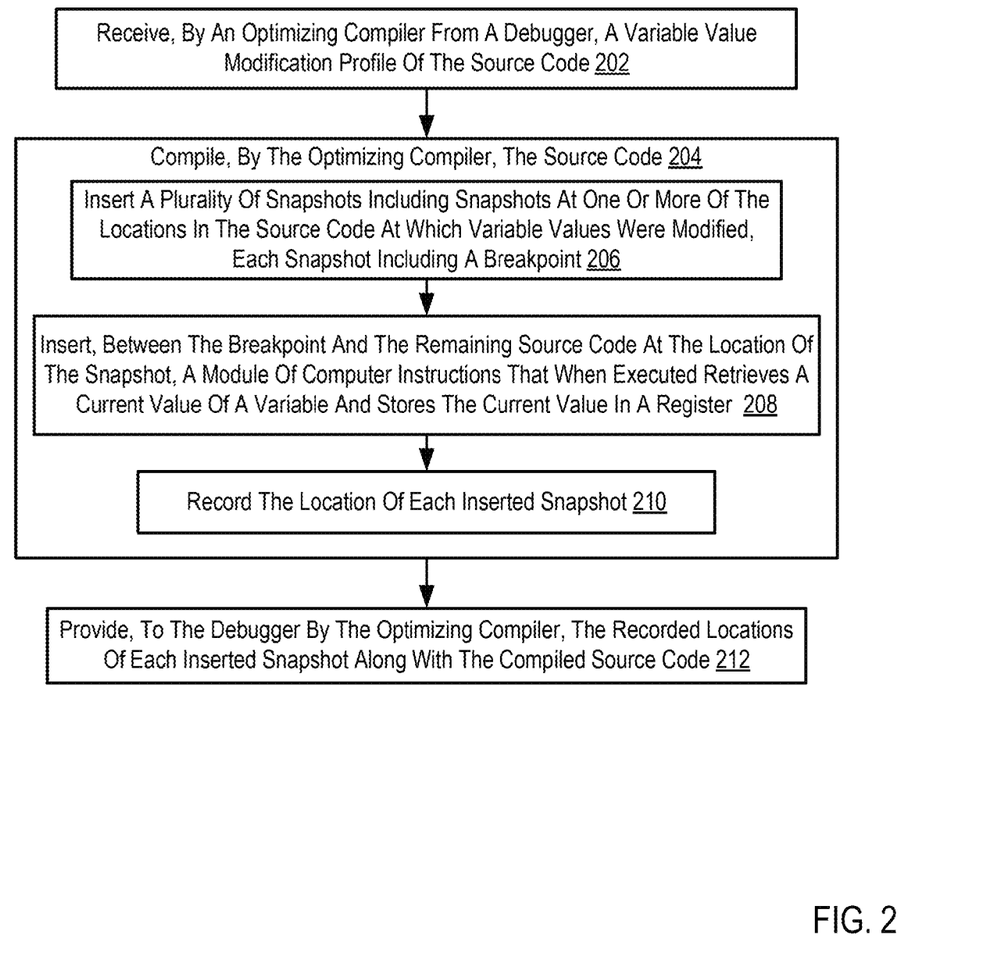
FIG. 2 sets forth a flow chart illustrating an exemplary method of compiling source code for debugging according to embodiments of the present invention FIG. 3 sets forth a flow chart illustrating an exemplary method for debugging source code in accordance with embodiments of the present invention.
Figure 3:
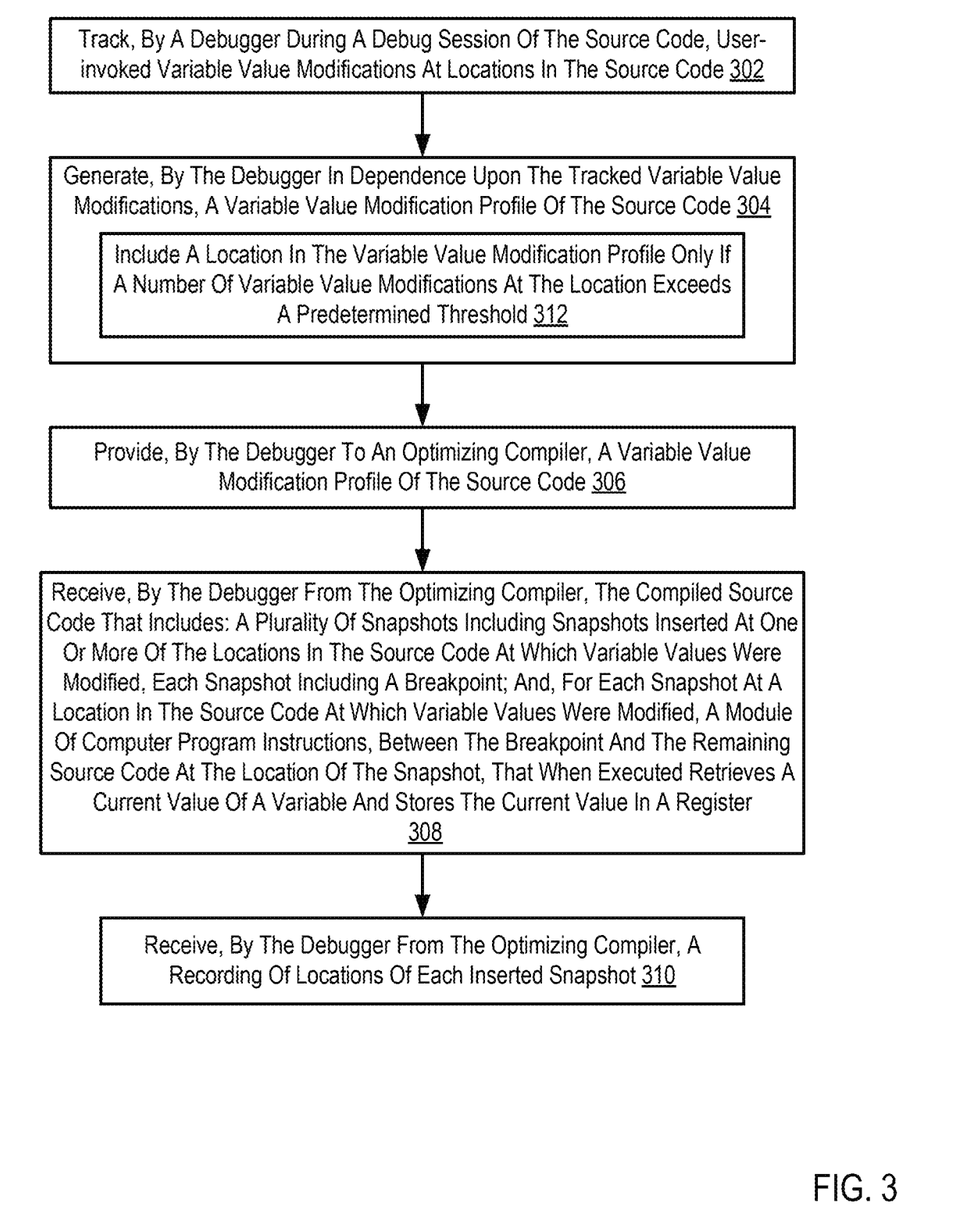

The method of FIG. 2 includes receiving (202), by an optimizing compiler from a debugger, a variable value modification profile of the source code. In the example of FIG. 2, the variable value modification profile specifies one or more locations in the source code at which variable values were modified during a debug session.

Receiving (202) such a variable value modification profile may be carried out in various ways including: loading the profile along with the uncompiled source code at compile time, receiving the profile from the debugger responsive to a request by the compiler, and in other ways as will occur to readers of skill in the art.

The method of FIG. 2 continues by compiling (204), by the optimizing compiler, the source code. In the method of FIG. 2, compiling (204) the source code includes inserting (206) a plurality of snapshots including snapshots at one or more of the locations in the source code at which variable values were modified. At each snapshot location, the compiler also inserts a breakpoint. Compiling (204) the source code also includes inserting between the breakpoint and the remaining source code at the location of the snapshot, a module of computer program instructions that when executed retrieves a current value of a variable and stores the current value in a register. Inserting (208) the module of computer program instructions that when executed retrieves a current value of a variable and stores the current vale in a register is carried out only for snapshot locations in the source code at which variable values were modified by the user in a previous debug session.

Compiling (204) the source code also includes recording (210) the location of each inserted snapshot. Recording (210) the location of each inserted snapshot may be carried out in various ways including, for example, storing a specification of each source code line number corresponding to the inserted snapshot in a data structure. The recording of the locations may be implemented in various ways including, for example, as an object file or the like.

The method of FIG. 2 also includes providing (212), to the debugger by the optimizing compiler, the recorded locations of each inserted snapshot along with the compiled source code. The optimizing compiler may provide (212) the recorded locations and the compiled source code in various ways including, for example, storing the source code and the recorded locations of the snapshots in a memory location accessible by the debugger.

For further explanation, FIG. 3 sets forth a flow chart illustrating an exemplary method for debugging source code in accordance with embodiments of the present invention. The method of FIG. 3 includes tracking (302), by a debugger during a debug session of the source code, user-invoked variable value modifications at locations in the source code. The source code in this debug session includes variable value restoration instructions for each and every snapshot. Tracking (302) such variable value modifications may be carried out in various ways including, for example, incrementing, upon a modification of a variable's value, a counter associated with a variable and a location at which the modification occurred.

The method of FIG. 3 also includes generating (304), by the debugger in dependence upon the tracked variable value modifications, a variable value modification profile of the source code. Generating (304) a variable value modification profile of the source code may be carried out by storing, in a data structure, a specification of one or more locations in the source code at which variable values were modified during the debug session. In the example of FIG. 3, generating (304) the variable value modification profile is also carried out by including (312) a location in the variable value modification profile only if a number of variable value modifications at the location exceeds a predetermined threshold.

The method of FIG. 3 also includes providing (306), by the debugger to an optimizing compiler, the variable value modification profile of the source code. The debugger may provide (306) the variable value modification profile to an optimizing compiler in various ways including, directly providing the profile to the optimizing compiler through an Application Programming Interface ('API') exposed by the compiler to the debugger, by storing the profile as a data structure of the source code itself, by storing the profile as a separate file in memory location known to and accessible by the optimizing compiler, and so on as will occur to readers of skill in the art.

The method of FIG. 3 also includes receiving (310), by the debugger from the optimizing compiler, compiled source code that includes: a plurality of snapshots including snapshots inserted at one or more of the locations in the source code at which variable values were modified, each snapshot including a breakpoint. The compiled source code also includes, only for each snapshot at a location in the source code at which variable values were modified: a module of computer program instructions, between the breakpoint and the remaining source code at the location of the snapshot, that when executed retrieves a current value of a variable and stores the current value in a register. That is, the compiler provides to the debugger compiled source code that includes variable value restoration instructions only at snapshots at which a user modified the variable value in a previous debug session.

The method of FIG. 3 also includes receiving (310), by the debugger from the optimizing compiler, a recording of the location of each inserted snapshot. The recording of the snapshot locations informs the debugger of the locations such that the debugger may configure the debug session accordingly—providing GUI interfaces for variable value modification, for example.

Figure 4:
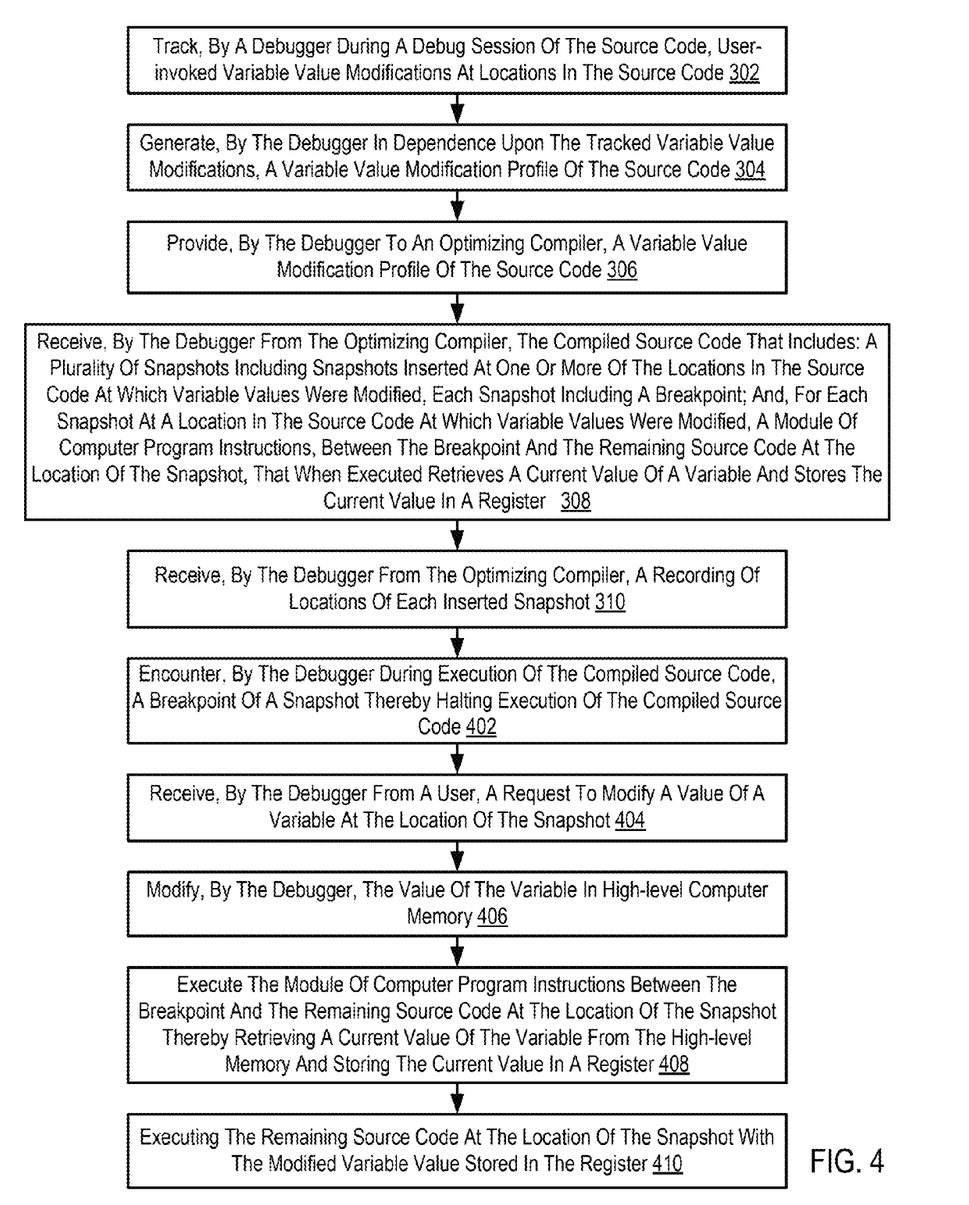
FIG. 4 sets forth a flow chart illustrating a further exemplary method for debugging source code according to embodiments of the present invention.

For further explanation, FIG. 4 sets forth a flow chart illustrating a further exemplary method for debugging source code according to embodiments of the present invention. The method of FIG. 4 is similar to the method of FIG. 3 in that the method of FIG. 4 includes tracking (302) user-invoked variable value modifications at locations in the source code; generating (304) a variable value modification profile of the source code; providing (306) the profile of the source code to an optimizing compiler; receiving (308) compiled source code; and receiving (310) a recording of the location of each inserted snapshot.

The method of FIG. 4 differs from the method of FIG. 3, however, in that the method of FIG. 4 continues by encountering (402), by the debugger during execution of the compiled source code, a breakpoint of a snapshot thereby halting execution of the compiled source code. Then, upon the execution halting, the debugger may determine, from the recorded locations of the snapshots, whether the location at which execution halted includes variable value restoration instructions. If so, the debugger may provide a user interface for modifying such variables.

The method of FIG. 4 continues by receiving (404), by the debugger from a user, a request to modify a value of a variable at the location of the snapshot and modifying (406) the value of the variable in high-level computer memory. Modifying (406) the value of the variable in high-level computer memory (such as RAM), may be carried out by storing at the memory address of the variable a value provided the user.

The method of FIG. 4 continues by executing (408) the module of computer program instructions between the breakpoint and the remaining source code at the location of the snapshot thereby retrieving a current value of the variable from the high-level memory and storing the current value in a register. That is, upon resuming execution, the first instructions executed are the variable value restoration instructions. Then, without further user interaction, the method of FIG. 4 continues by executing (410) the remaining source code at the location of the snapshot with the modified variable value stored in the register.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer program instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of compiling source code for debugging, the method comprising:

receiving, by an optimizing compiler from a debugger, a variable value modification profile of the source code, the variable value modification profile specifying one or more locations in the source code at which variable values were modified during a debug session;

compiling, by the optimizing compiler, the source code, including:
  inserting a plurality of snapshots including snapshots at one or more of the locations in the source code at which variable values were modified, each snapshot including a breakpoint, wherein each snapshot comprises a directive and a specification of one or more variables, the directive enabling the user to establish a breakpoint in a debug session at the location of the snapshot and examine the specified variables when execution reaches the snapshot location;
  only for each snapshot at a location in the source code at which variable values were modified: inserting, between the breakpoint and the remaining source code at the location of the snapshot, a module of computer program instructions that when executed retrieves a current value of a variable and stores the current value in a register; and
  recording the location of each inserted snapshot; and
providing, to the debugger by the optimizing compiler, the recorded locations of each inserted snapshot along with the compiled source code.

2. The method of claim 1 further comprising:
tracking, by the debugger during a debug session of the source code, user-invoked variable value modifications at locations in the source code;
generating, by the debugger in dependence upon the tracked variable value modifications, a variable value modification profile of the source code; and
providing, by the debugger to an optimizing compiler, the variable value modification profile of the source code.

3. The method of claim 2 wherein generating the variable value modification profile of the source code further comprises:
including a location in the variable value modification profile only if a number of variable value modifications at the location exceeds a predetermined threshold.

4. The method of claim 1 further comprising:
encountering, by the debugger during execution of the compiled source code, a breakpoint of a snapshot thereby halting execution of the compiled source code;
receiving, by the debugger from a user, a request to modify a value of a variable at the location of the snapshot;
modifying, by the debugger, the value of the variable in high-level computer memory; and
executing the module of computer program instructions between the breakpoint and the remaining source code at the location of the snapshot thereby retrieving a current value of the variable from the high-level memory and storing the current value in a register; and
executing the remaining source code at the location of the snapshot with the modified variable value stored in the register.

5. An apparatus for compiling source code for debugging, the apparatus comprising a computer processor, a computer memory operatively coupled to the computer processor, the computer memory having disposed within it computer program instructions that, when executed by the computer processor, cause the apparatus to carry out the steps of:
receiving, by an optimizing compiler from a debugger, a variable value modification profile of the source code, the variable value modification profile specifying one or more locations in the source code at which variable values were modified during a debug session;

compiling, by the optimizing compiler, the source code, including:
: inserting a plurality of snapshots including snapshots at one or more of the locations in the source code at which variable values were modified, each snapshot including a breakpoint, wherein each snapshot comprises a directive and a specification of one or more variables, the directive enabling the user to establish a breakpoint in a debug session at the location of the snapshot and examine the specified variables when execution reaches the snapshot location;
: only for each snapshot at a location in the source code at which variable values were modified: inserting, between the breakpoint and the remaining source code at the location of the snapshot, a module of computer program instructions that when executed retrieves a current value of a variable and stores the current value in a register; and
: recording the location of each inserted snapshot; and
: providing, to the debugger by the optimizing compiler, the recorded locations of each inserted snapshot along with the compiled source code.

6. The apparatus of claim 5 further comprising computer program instructions that, when executed by the computer processor, cause the apparatus to carry out the steps of:
: tracking, by the debugger during a debug session of the source code, user-invoked variable value modifications at locations in the source code;
: generating, by the debugger in dependence upon the tracked variable value modifications, a variable value modification profile of the source code; and
: providing, by the debugger to an optimizing compiler, the variable value modification profile of the source code.

7. The apparatus of claim 6 wherein generating the variable value modification profile of the source code further comprises:
: including a location in the variable value modification profile only if a number of variable value modifications at the location exceeds a predetermined threshold.

8. The apparatus of claim 5 further comprising computer program instructions that, when executed by the computer processor, cause the apparatus to carry out the steps of:
: encountering, by the debugger during execution of the compiled source code, a breakpoint of a snapshot thereby halting execution of the compiled source code;
: receiving, by the debugger from a user, a request to modify a value of a variable at the location of the snapshot;
: modifying, by the debugger, the value of the variable in high-level computer memory; and
: executing the module of computer program instructions between the breakpoint and the remaining source code at the location of the snapshot thereby retrieving a current value of the variable from the high-level memory and storing the current value in a register; and
: executing the remaining source code at the location of the snapshot with the modified variable value stored in the register.

9. A computer program product for compiling source code for debugging, the computer program product disposed upon a computer readable storage medium that is not a signal, the computer program product comprising computer program instructions that, when executed, cause a computer to carry out the steps of:
: receiving, by an optimizing compiler from a debugger, a variable value modification profile of the source code, the variable value modification profile specifying one or more locations in the source code at which variable values were modified during a debug session;
: compiling, by the optimizing compiler, the source code, including:
:: inserting a plurality of snapshots including snapshots at one or more of the locations in the source code at which variable values were modified, each snapshot including a breakpoint, wherein each snapshot comprises a directive and a specification of one or more variables, the directive enabling the user to establish a breakpoint in a debug session at the location of the snapshot and examine the specified variables when execution reaches the snapshot location;
:: only for each snapshot at a location in the source code at which variable values were modified: inserting, between the breakpoint and the remaining source code at the location of the snapshot, a module of computer program instructions that when executed retrieves a current value of a variable and stores the current value in a register; and
:: recording the location of each inserted snapshot; and
: providing, to the debugger by the optimizing compiler, the recorded locations of each inserted snapshot along with the compiled source code.

10. The computer program product of claim 9 further comprising computer program instructions that, when executed, cause the computer to carry out the steps of:
: tracking, by the debugger during a debug session of the source code, user-invoked variable value modifications at locations in the source code;
: generating, by the debugger in dependence upon the tracked variable value modifications, a variable value modification profile of the source code; and
: providing, by the debugger to an optimizing compiler, the variable value modification profile of the source code.

11. The computer program product of claim 10 wherein generating the variable value modification profile of the source code further comprises:
: including a location in the variable value modification profile only if a number of variable value modifications at the location exceeds a predetermined threshold.

12. The computer program product of claim 9 further comprising computer program instructions that, when executed, cause the computer to carry out the steps of:
: encountering, by the debugger during execution of the compiled source code, a breakpoint of a snapshot thereby halting execution of the compiled source code;
: receiving, by the debugger from a user, a request to modify a value of a variable at the location of the snapshot;
: modifying, by the debugger, the value of the variable in high-level computer memory; and
: executing the module of computer program instructions between the breakpoint and the remaining source code at the location of the snapshot thereby retrieving a current value of the variable from the high-level memory and storing the current value in a register; and
: executing the remaining source code at the location of the snapshot with the modified variable value stored in the register.

13. A method of debugging source code, the method comprising:
: tracking, by a debugger during a debug session of the source code, user-invoked variable value modifications at locations in the source code;
: generating, by the debugger in dependence upon the tracked variable value modifications, a variable value modification profile of the source code;

providing, by the debugger to an optimizing compiler, the variable value modification profile of the source code;

receiving, by the debugger from the optimizing compiler, compiled source code that includes:

a plurality of snapshots including snapshots inserted at one or more of the locations in the source code at which variable values were modified, each snapshot including a breakpoint, wherein each snapshot comprises a directive and a specification of one or more variables, the directive enabling the user to establish a breakpoint in a debug session at the location of the snapshot and examine the specified variables when execution reaches the snapshot location; and  only for each snapshot at a location in the source code at which variable values were modified: a module of computer program instructions, between the breakpoint and the remaining source code at the location of the snapshot, that when executed retrieves a current value of a variable and stores the current value in a register; and receiving, by the debugger from the optimizing compiler, a recording of the location of each inserted snapshot.

14. The method of claim 13 wherein generating the variable value modification profile of the source code further comprises:

including a location in the variable value modification profile only if a number of variable value modifications at the location exceeds a predetermined threshold.

15. The method of claim 13 further comprising:

encountering, by the debugger during execution of the compiled source code, a breakpoint of a snapshot thereby halting execution of the compiled source code;

receiving, by the debugger from a user, a request to modify a value of a variable at the location of the snapshot;

modifying, by the debugger, the value of the variable in high-level computer memory;

executing the module of computer program instructions between the breakpoint and the remaining source code at the location of the snapshot thereby retrieving a current value of the variable from the high-level memory and storing the current value in a register; and  executing the remaining source code at the location of the snapshot with the modified variable value stored in the register.

\* \* \* \* \*